(12) United States Patent
Kondrk

(10) Patent No.: US 11,435,124 B2
(45) Date of Patent: Sep. 6, 2022

(54) REFRIGERATION SYSTEM WITH LEAK DETECTION

(71) Applicant: Carrier Corporation, Palm Beach Gardens, FL (US)

(72) Inventor: Jason R. Kondrk, Clay, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 449 days.

(21) Appl. No.: 16/245,900

(22) Filed: Jan. 11, 2019

(65) Prior Publication Data
US 2019/0264963 A1    Aug. 29, 2019

Related U.S. Application Data

(60) Provisional application No. 62/636,250, filed on Feb. 28, 2018.

(51) Int. Cl.
*F25B 47/00* (2006.01)
*B60H 1/32* (2006.01)
(Continued)

(52) U.S. Cl.
CPC ........... *F25B 47/00* (2013.01); *B60H 1/3205* (2013.01); *B60H 1/3232* (2013.01); *F25B 5/02* (2013.01); *F25B 39/028* (2013.01); *F25B 49/005* (2013.01); *B60H 2001/328* (2013.01); *B60H 2001/3242* (2013.01); *F25B 2400/22* (2013.01);
(Continued)

(58) Field of Classification Search
CPC .......... F25B 47/00; F25B 5/02; F25B 39/028; F25B 49/005; F25B 2500/222; F25B 2500/221; F25B 2500/22; F25B 2600/11; F25B 2600/112; F25B 2600/2511;
(Continued)

(56) References Cited

U.S. PATENT DOCUMENTS 5,007,245 A    4/1991    Defenbaugh et al.
6,047,557 A    4/2000    Pham et al.
(Continued)

FOREIGN PATENT DOCUMENTS

CN    101487639    7/2009
CN    201992900 U    9/2011
(Continued)

OTHER PUBLICATIONS

Machine translation of WO2018220810 (Year: 2018).*
(Continued)

*Primary Examiner* — Joseph F Trpisovsky
(74) *Attorney, Agent, or Firm* — Carlson, Gaskey & Olds, P.C.

(57) ABSTRACT

A transportation refrigeration system includes a compartment to be conditioned. A refrigeration circuit is associated with an enclosure including a compressor. A condenser and an expansion valve are upstream of a first evaporator and a second evaporator. The first evaporator is in parallel with the second evaporator. A first enclosure surrounds the first evaporator. The first enclosure includes a first refrigerant detection sensor in communication with a controller. A second enclosure surrounds the second evaporator. The second enclosure includes a second refrigeration detection sensor in communication with the controller.

8 Claims, 1 Drawing Sheet

(51) Int. Cl.
*F25B 39/02* (2006.01)
*F25B 49/00* (2006.01)
*F25B 5/02* (2006.01)

(52) U.S. Cl.
CPC ..... *F25B 2500/222* (2013.01); *F25B 2500/27* (2013.01); *F25B 2600/11* (2013.01); *F25B 2600/112* (2013.01); *F25B 2600/2511* (2013.01); *F25B 2600/2519* (2013.01); *F25B 2700/04* (2013.01)

(58) Field of Classification Search
CPC ......... F25B 2600/2519; F25B 2700/04; B60H 1/3205; B60H 1/3232; F24F 11/36
See application file for complete search history.

(56) References Cited

U.S. PATENT DOCUMENTS

| | | | |
|---|---|---|---|
| 6,370,908 | B1 | 4/2002 | James |
| 6,983,793 | B2 | 1/2006 | Zheng et al. |
| 7,178,359 | B2 | 2/2007 | Oshitani et al. |
| 8,250,875 | B2 | 8/2012 | Rafalovich et al. |
| 8,459,049 | B2 | 6/2013 | Li |
| 8,677,779 | B2 | 3/2014 | Lambert |
| 2008/0190125 | A1 | 8/2008 | Yoshioka et al. |
| 2009/0272135 | A1 | 11/2009 | Nishimura |
| 2010/0107661 | A1* | 5/2010 | Awwad ................. F25D 29/003 62/80 |
| 2015/0233622 | A1 | 8/2015 | Yajima et al. |
| 2017/0016652 | A1 | 1/2017 | Thiessen |
| 2018/0180338 | A1* | 6/2018 | Honda ..................... F24F 11/89 |
| 2019/0011154 | A1* | 1/2019 | Takizawa ............. B60H 1/3213 |
| 2019/0049154 | A1 | 2/2019 | Ikeda et al. |

FOREIGN PATENT DOCUMENTS

| | | |
|---|---|---|
| CN | 203349586 | 12/2013 |
| CN | 203550265 U | 4/2014 |
| CN | 203657317 U | 6/2014 |
| CN | 104344586 | 2/2015 |
| CN | 204202231 U | 3/2015 |
| CN | 104677011 | 6/2015 |
| CN | 204705070 U | 10/2015 |
| CN | 106196678 | 12/2016 |
| CN | 106524649 | 3/2017 |
| CN | 206146031 U | 5/2017 |
| CN | 106907877 | 6/2017 |
| EP | 1243880 | 9/2002 |
| EP | 2075516 | 7/2009 |
| EP | 3508796 | 7/2019 |
| EP | 3680583 | 7/2020 |
| JP | 2000118231 | 4/2000 |
| JP | 2012184889 | 9/2012 |
| JP | 2017125673 | 7/2017 |
| WO | 2008094158 | 8/2008 |
| WO | 2016034446 | 3/2016 |
| WO | 2016088167 | 6/2016 |
| WO | 2016208470 | 12/2016 |
| WO | 2017056789 | 4/2017 |
| WO | 2017068909 | 4/2017 |
| WO | 2017141899 | 8/2017 |
| WO | WO-2018220810 A1 * 12/2018 .............. F24F 11/43 |  |

OTHER PUBLICATIONS

The Singapore Search Report and Written Opinion for SG Application No. 10201900435T, dated Jul. 30, 2019.
The Extended European Search Report for EP Application No. 19158861.5, dated Apr. 26, 2019.
Singapore Search Report and Written Opinion for SG Application No. 10202102936W dated Apr. 18, 2022.

* cited by examiner

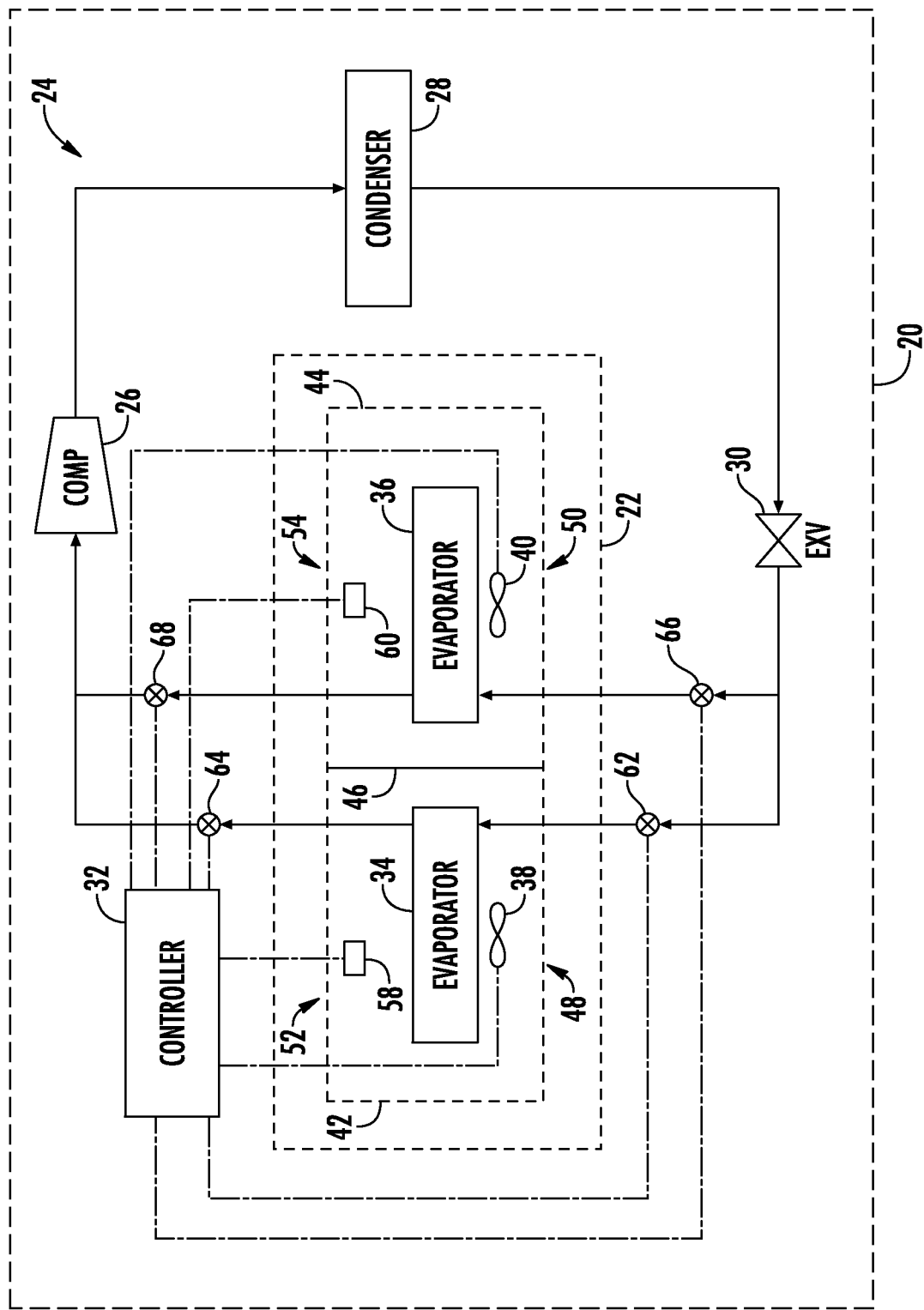

REFRIGERATION SYSTEM WITH LEAK DETECTION

CROSS-REFERENCE TO RELATED APPLICATIONS

This application claims priority to U.S. Provisional Application No. 62/636,250, which was filed on Feb. 28, 2018 and is incorporated herein by reference.

BACKGROUND

This application relates to parallel evaporator arrangement for a single-temperature transportation refrigeration system which cools a single environment and utilizes a common condenser.

Refrigeration systems are known. Generally, a compressor compresses a refrigerant and delivers it into a condenser. The refrigerant is cooled and passes through an expansion valve. The refrigerant is expanded and passes through an evaporator. The evaporator cools air to be delivered into an environment to be conditioned.

One application for such refrigeration systems is in a transportation refrigeration system. As an example, a truck may have a refrigerated trailer. It is known to provide distinct temperatures at distinct compartments within a common trailer. Individual refrigeration circuits are often utilized to provide the distinct temperatures.

SUMMARY

In one exemplary embodiment, a transportation refrigeration system includes a compartment to be conditioned. A refrigeration circuit is associated with an enclosure including a compressor. A condenser and an expansion valve are upstream of a first evaporator and a second evaporator. The first evaporator is in parallel with the second evaporator. A first enclosure surrounds the first evaporator. The first enclosure includes a first refrigerant detection sensor in communication with a controller. A second enclosure surrounds the second evaporator. The second enclosure includes a second refrigeration detection sensor in communication with the controller.

In a further embodiment of any of the above, the refrigeration circuit includes a first evaporator inlet shut-off valve and a first evaporator outlet shut-off valve.

In a further embodiment of any of the above, the refrigeration circuit includes a second evaporator inlet shut-off valve and a second evaporator outlet shut-off valve.

In a further embodiment of any of the above, the first enclosure includes a first refrigerant detection sensor in communication with the controller.

In a further embodiment of any of the above, the second enclosure includes a second refrigerant detection sensor in communication with the controller.

In a further embodiment of any of the above, the refrigeration circuit includes a first fan directed at the first evaporator.

In a further embodiment of any of the above, the refrigeration circuit includes a second fan directed at the second evaporator.

In a further embodiment of any of the above, the first fan and the second fan are independently operable.

In a further embodiment of any of the above, the first evaporator inlet shut-off valve, the first evaporator outlet shut-off valve, the second evaporator inlet shut-off valve and the second evaporator outlet shut-off valve are solenoid valves in communication with the controller.

In a further embodiment of any of the above, the first enclosure is separated from the second enclosure by a bulkhead.

In a further embodiment of any of the above, the first evaporator inlet shut-off valve, the first evaporator outlet shut-off valve, the second evaporator inlet shut-off valve and the second evaporator outlet shut-off valve are located outside of the compartment.

In a further embodiment of any of the above, the first refrigerant detection sensor is configured to identify the presence of refrigerant in an atmosphere of the first enclosure. The second refrigerant detection sensor is configured to identify the presence of refrigerant in an atmosphere of the second enclosure.

In another exemplary embodiment, a method of operating a refrigeration cycle includes the steps of conditioning a compartment with a refrigeration circuit to a first temperature. The refrigeration circuit includes a compressor, a condenser, an expansion valve upstream of a first evaporator and a second evaporator. The first evaporator is in parallel with the second evaporator. A refrigerant leak is detected in a first enclosure which includes the first evaporator with a first refrigerant sensor. The first evaporator is isolated from the refrigerant circuit by closing a first evaporator inlet shut-off valve and a first evaporator outlet shut-off valve.

In a further embodiment of any of the above, the method includes disabling a first fan located adjacent the first evaporator upon detecting a refrigerant leak in the first enclosure.

In a further embodiment of any of the above, the method includes conditioning the compartment with only the second evaporator to a second temperature greater than the first temperature.

In a further embodiment of any of the above, the method includes detecting a refrigerant leak in a second enclosure which includes the second evaporator with a second refrigerant sensor.

In a further embodiment of any of the above, the method includes isolating the second evaporator from the refrigerant circuit by closing a second evaporator inlet shut-off valve and a second evaporator outlet shut-off valve.

In a further embodiment of any of the above, the method includes disabling a second fan located adjacent the second evaporator upon detecting a refrigerant leak in the second enclosure.

In a further embodiment of any of the above, the first refrigerant sensor identifies the presence of refrigerant in the atmosphere of the first enclosure.

In a further embodiment of any of the above, the method includes providing equal amounts of conditioning with the first evaporator and the second evaporator to the compartment.

These and other features of the disclosed examples can be understood from the following description and the accompanying drawings, which can be briefly described as follows.

BRIEF DESCRIPTION OF THE DRAWINGS

FIG. 1 schematically shows a refrigeration transportation system.

DETAILED DESCRIPTION

FIG. 1 illustrates a refrigerated system 20. As known, the refrigerated system 20 may be a refrigerated cargo compartment associated with a truck or another type of refrigerated cargo system, such as a trailer, a shipboard container, etc. In the illustrated non-limiting example, the refrigerated system 20 includes a single distinct compartment 22 that is conditioned. The single distinct compartment 22 is maintained at a single temperature level during normal operating conditions. A refrigeration circuit 24 is provided to maintain the single distinct compartment 22 at the desired operating temperature.

The refrigeration circuit 24 includes a compressor 26 that compresses and delivers a refrigerant, such as low GWP refrigerant, to a condenser 28 located downstream of the compressor 26. The condenser 28 removes heat from the refrigerant. Downstream of the condenser 26, the refrigerant passes through an expansion device 30. The expansion device 30 may be an electronic expansion device which is capable of being controlled to open to any number of varying positions after receiving commands from a controller 32.

A first evaporator 34 and a second evaporator 36 are located downstream of the expansion device 30. The first and second evaporators 34, 36 are fluidly in parallel with each other such that the refrigerant will pass through only one of the first and second evaporators 34, 36 during each loop through the refrigeration circuit 24. This allows the first and second evaporators 34, 36 to provide equal amounts of cooling. After the refrigerant passes through the first and second evaporators 34, 36, the refrigerant will travel back to the compressor 26 and through the refrigeration circuit 24 again.

The first and second evaporators 34 and 36 condition the single distinct compartment 22 to the desired temperature by transferring heat from the single distinct compartment 22 into the refrigerant. The first and second evaporators 34, 36 are aided in transferring heat from the environment of the single distinct compartment 22 into the refrigerant by a first fan 38 and a second fan 40, respectively.

The first fan 38 and the first evaporator 34 are located in a first enclosure 42 and the second fan 40 and the second evaporator 36 are located in a second enclosure 44. The first and second enclosures 42, 44 are separated from each other by a bulkhead 46. The first and second enclosures 42, 44 include first and second enclosure inlets 48, 50 and first and second enclosure outlets 52, 54, respectively. The first and second enclosures 42, 44 allow air from the single distinct compartment 22 to flow over the first and second evaporators 34, 36, respectively, while fluidly separating the air in each of the first and second enclosures 42, 44 from each other.

During operation of the refrigeration circuit 24, the refrigerant travels in a loop through the compressor 26, the condenser 28, the expansion device 30, and the first and second evaporators 34, 36. While operating the refrigeration circuit 24, it is possible that a refrigerant leak may develop in one or both of the first and second evaporators 34, 36 or with adjacent connections to the first and second evaporators 34, 36 in the first and second enclosure 42, 44, respectively.

A refrigerant leak in either of the first or second evaporators 34, 36 or in the surrounding structure will be detected by either a first refrigerant sensor 58 located in the first enclosure 42 or a second refrigerant sensor 60 located in the second enclosure 54. In the illustrated non-limiting example, the first and second refrigerant sensors 58, 60 are located in the first and second enclosures 52, 54, adjacent the first and second enclosure outlets 52, 54, respectively, in order to be exposed to a greater amount of fluid traveling through the first and second enclosures 52, 54. The first and second refrigerant sensors 58, 60 detect the presence of refrigerant in the atmosphere of the first and second enclosures, 42, 44.

When a refrigerant leak is detected by the first refrigerant sensor 58, a signal is sent to the controller 32 and the controller 32 sends a signal to close a first evaporator inlet shut-off valve 62 and a first evaporator outlet shut-off valve 64 in the refrigeration circuit 24. The controller 32 also sends a signal to stop the first fan 38 when shutting the first evaporator inlet and outlet shut-off valves 62, 64. By closing the first evaporator inlet and outlet shut-off valves 62, 64, which are located outside of the single distinct compartment 22, the amount of refrigerant that can leak into the single distinct compartment 22 is limited to the amount of refrigerant located between the first evaporator inlet and outlet shut-off valves 62, 64. When the first evaporator inlet and outlet shut-off valves 62, 64 are closed, the first evaporator 34 becomes fluidly isolated from the rest of the refrigeration circuit 24.

Similarly, when a refrigerant leak is detected by the second refrigerant sensor 60, a signal is sent to the controller 32 and the controller 32 sends a signal to close a second evaporator inlet shut-off valve 66 and a second evaporator outlet shut-off valve 68 in the refrigeration circuit 24. The controller 32 also sends a signal to stop the second fan 40 when shutting the second evaporator inlet and outlet shutoff valves 66, 68. By closing the second evaporator inlet and outlet shut-off valves 66, 68, which are located outside of the single distinct compartment 22, the amount of refrigerant that can leak into the single distinct compartment 22 is limited to the amount of refrigerant located between the second evaporator inlet and outlet shut-off valves 66, 68. When the second evaporator inlet and outlet shut-off valves 66, 68 are closed, the second evaporator 36 becomes fluidly isolated from the rest of the refrigeration circuit 24.

In the illustrated example, the first evaporator inlet and outlet shut-off valves 62, 64 and the second evaporator inlet and outlet shut-off valves 66, 68 are solenoid valves. However, other types of valves could be used in place of the solenoid valves.

The isolating function of the first evaporator inlet and outlet shut-off valves 62, 64 and the second evaporator inlet and outlet shut-off valves 66, 68 allows the non-isolated evaporator to continue to function in the refrigeration circuit 24 and maintain the single distinct compartment 22 desired operating temperature. If the single compartment 22 desired operating temperature cannot be maintained due to operating at a reduced capacity with only a single evaporator, the amount of time before the single distinct compartment 22 reaches a temperature that is undesirable for the goods in the single distinct compartment 22 is extended such that the chance of damaging the goods is reduced. If the refrigeration circuit 24 enters any of the isolation modes discussed above, the controller 32 will provide an alarm or display a message indicating that a leak has occurred.

Moreover, in the case that a refrigerant leak is detected by both the first refrigerant leak sensor 58 and the second refrigerant sensor 60, both the first and second evaporators 34, 36 would become fluidly isolated from the rest of the refrigeration circuit 24. This would result in the refrigeration circuit 24 no longer being able to function.

Although an example of this invention has been disclosed, a worker of ordinary skill in this art would recognize that certain modifications would come within the scope of this disclosure. For that reason, the following claims should be studied to determine the true scope and content of this disclosure.

What is claimed is:

1. A method of operating a refrigeration cycle comprising the steps of:
conditioning a compartment with a refrigeration circuit to a first temperature, wherein the refrigeration circuit includes a compressor, a condenser, an expansion valve upstream of a first evaporator and a second evaporator, wherein the first evaporator is in parallel with the second evaporator;
detecting a refrigerant leak in a first enclosure including the first evaporator with a first refrigerant sensor located in the first enclosure;
isolating the first evaporator from the refrigeration circuit by closing a first evaporator inlet shut-off valve and a first evaporator outlet shut-off valve; and
conditioning the compartment with only the second evaporator to a second temperature greater than the first temperature.

2. The method of claim 1, including disabling a first fan located adjacent the first evaporator upon detecting a refrigerant leak in the first enclosure.

3. The method of claim 1, including detecting a refrigerant leak in a second enclosure including the second evaporator with a second refrigerant sensor located in the second enclosure.

4. The method of claim 3, including isolating the second evaporator from the refrigerant circuit by closing a second evaporator inlet shut-off valve and a second evaporator outlet shut-off valve.

5. The method of claim 3, including disabling a second fan located adjacent the second evaporator upon detecting a refrigerant leak in the second enclosure.

6. The method of claim 1, wherein the first refrigerant sensor identifies the presence of refrigerant in the atmosphere of the first enclosure.

7. The method of claim 1, including providing equal amounts of conditioning with the first evaporator and the second evaporator to the compartment.

8. The method of claim 3, wherein the first enclosure and the second enclosure are located in the compartment.

* * * * *